Aug. 4, 1964　　　TAKASHI HIGUCHI　　　3,143,590
ZOOM LENS
Filed Feb. 14, 1962

INVENTOR.
TAKASHI HIGUCHI 3,143,590
ZOOM LENS
Takashi Higuchi, Hodogaya-ku, Yokohama-shi, Japan, assignor to Nippon Kogaku K.K., Tokyo, Japan, a corporation of Japan
Filed Feb. 14, 1962, Ser. No. 173,183
Claims priority, application Japan Feb. 28, 1961
2 Claims. (Cl. 88—57)

This invention relates to a zoom lens, which not only is particularly suitable for still cameras but also can be used for television and motion picture cameras. Zoom lenses have been developed for a number of years for television and motion picture purposes, but many of them having an angle of field mostly less than 40° have been found insufficiently sharp for use in a still camera, and are bulky and heavy. In this invention, a zoom lens with a wide angle of field (63°), which had formerly been considered impossible, is provided for still cameras.

This invention will be explained in detail referring to the attached drawing in which.

Figure 1:
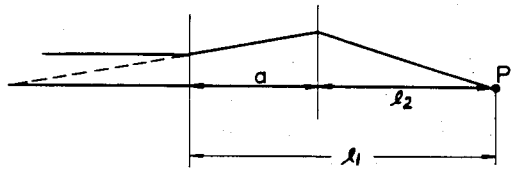
FIG. 1 shows the fundamental basis of this invention.
Figure 2:
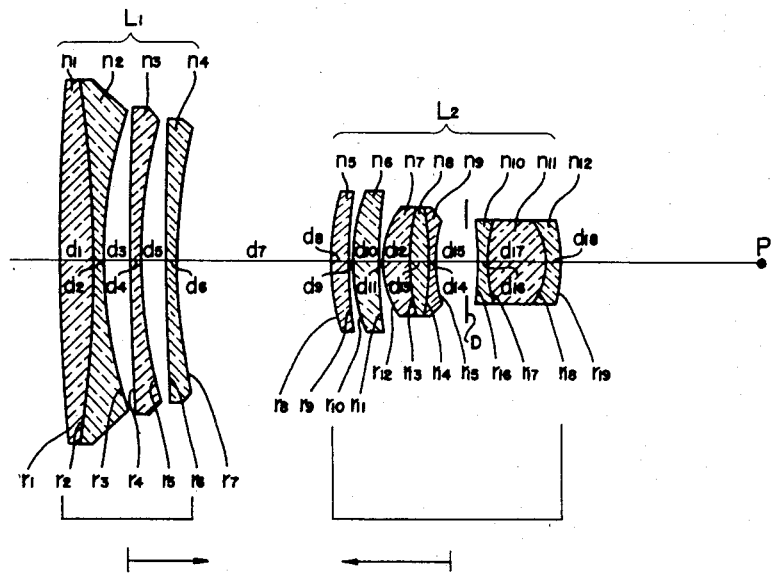
FIG. 2 shows an illustrated practical embodiment of this invention.

As is clear from FIGS. 1 and 2, the zoom lens of this invention is made up of the generally called "the first group of negative lenses" ($L_1$) and "the second group of convex lenses" ($L_2$), each consisting of a certain number of lenses. By shifting these two groups of lenses ($L_1$ and $L_2$) axially relative each other as indicated by the arrows in FIG. 2, various magnifications can be attained continuously without any displacement of the focused image. In consideration of the performance of this zoom lens for still cameras, and convenience in using it, the entire lens array is assembled compactly, by making the second group of positive lenses ($L_2$) play two roles, namely, the magnifying lens and the relay lens. Moreover, since the first group of negative lenses ($L_1$) is placed in front of the group of positive lenses ($L_2$), in other words, the so-called retrofocus system is adopted, the shortcoming of zoom lenses that the back-focus generally becomes shorter is eliminated, and therefore, this zoom lens can also be installed in a single lens reflex camera.

By putting an iris diaphragm D into the second group of positive lenses ($L_2$) and by shifting it together with the group of positive lenses ($L_2$), the function of the second group of positive lenses as the relay lens is most effectively developed and the unbalance of aberration likely to occur when this lens system used as a telephoto lens, where the two groups of lenses approach each other, can be reduced to a minimum. In FIG. 1, let the focal distances $f_1$ and $f_2$ of the first group of negative lenses ($L_1$) and the second group of positive lenses ($L_2$) be $f_1 < 0$ and $f_2 > 0$, respectively, the compound focal distance be $f$, the distances from the fixed focal plane (P) to the principal planes of the first group of negative lenses and the second group of positive lenses be $l_1$ and $l_2$ respectively; and further let the distance between the principal plane of the first group of negative lenses and that of the second group of positive lenses be $a$. It will be noted that $l_1$, $l_2$ and $a$ are variable in magnitude depending on the spacing between the first and second groups of lenses, $l_1$ and $l_2$ being a maximum and $a$ being a minimum when the two groups of lenses are closest to each other, and $l_1$ and $l_2$ being a minimum and $a$ a maximum when the two groups are furthest apart, that is, when the compound focal length $f$ is a minimum. Then the following equations are obtained:

$$f = \frac{f_1 f_2}{f_1 + f_2 - a} \quad (1)$$

$$l_2 = \frac{f_1 f_2 - f_2 a}{f_1 + f_2 - a} \quad (2)$$

$$l_1 = \frac{f_1 f_2 + f_1 a - a^2}{f_1 + f_2 - a} \quad (3)$$

By shifting the first group of negative lenses and the second group of positive lenses so as to observe the relations given in above Equations 2 and 3, the desired zoom lens can be obtained. Judging from optical performances, the zoom ratio, size, etc. of the lens system, the most effective combination of $f_1$ and $f_2$ is as follows:

$$|\tfrac{1}{3} f_1| \leq f_2 \leq |\tfrac{3}{4} f_1|$$

Now, the actual construction of the lenses of this invention will be explained in the following, with reference to FIG. 2 which illustrates a practical example of the zoom lens of this invention obtained on the basis of the above-mentioned shifting method. As is shown in FIG. 2, the first group of negative lenses ($L_1$) consists of a front cemented lens with a concave lens and a convex lens joined together, and in addition of one or more (two in the embodiment shown in FIG. 2) spaced concave lenses cooperating with the cemented lens. Curvature of the cemented plane between the concave and convex lenses of the front cemented lens is selected so as to improve the spherical aberration when the lens system is used with a longer focal length and also to correct the unbalance of the astigmatism when the system is used with a shorter focal length (that is for wider angle) in respect to the longer focal length (that is for telephoto). The second group of positive lenses ($L_2$) is of a modified type of sonar type lens system and is generally composed of eight lenses arranged in four blocks. The group is made up of a set of one or more (two in the embodiment shown in FIG. 2) positive single lenses, a set of meniscus (crescent) shaped three lenses joined together with its convex side facing the object and a set of three lenses joined together with its convex side facing the image. Since the influence of spherical aberration is small in the longer focal length position when the zoom ratio is small or the maximum F number of the zoom lens is large, one or more lenses in the first group of negative lenses ($L_1$) and one or more in the second group of positive lenses ($L_2$) can be omitted. On the contrary, when the zoom ratio is large or the maximum F number is small, the spherical aberration would be corrected by putting a convex single lens at either end of the second group of positive lenses ($L_2$). The following limitations are placed from the viewpoint of correcting the aberration, where the radius of curvature $r$, the index of refraction $n$, and the thickness of the lens or the space between successive lens surfaces $d$, all in the direction from object to image, each with subscripts are as hereinafter defined:

(I) $r_3 \leq |\tfrac{1}{2} r_1|$ (II) $0.3 f_2 \leq r_{12} \leq 0.5 f_2$ (III) $0.8 f_2 \leq r_{13} \leq 1.4 f_2$ (IV) $0.2 f_2 \leq r_{15} \leq 0.3 f_2$ (V) $0.5 f_2 \leq r_{17} \leq 0.8 f_2$ (VI) $0.2 f_2 \leq -r_{18} \leq 0.5 f_2$ (VII) $1.65 \leq n_7 \leq 1.74$ (VIII) $1.43 \leq n_8 \leq 1.56$ (IX) $1.66 \leq n_9 \leq 1.77$ (X) $1.50 \leq n_{10} \leq 1.58$ (XI) $1.64 \leq n_{11} \leq 1.73$ (XII) $1.51 \leq n_{12} \leq 1.64$ (XIII) $0.1 f_2 \leq d_{15} \leq 0.3 f_2$ Hitherto a zoom lens of wide angle has presented a tendency to cause a fairly marked negative distortion of image when its focal distance is short, but condition (I) above enables us to reduce this aberration to an extent permissible in practice. Also in a zoom lens of such type when the relay lens is shifted, the spherical aberration has a tendency to be over corrected when the focal length is long, but this aberration can be properly corrected by above conditions of (IV), (VI) and (XI). Generally speaking, in the zoom lens, the balance of astigmatism at short focal length (wide angle) and long focal length (telephoto) has a tendency to be upset. This tendency, however, can be eliminated by proper selection of the radius of curvature of the cemented surface in the first group of negative lenses ($L_1$) and above conditions of (II), (III), (VIII) and (XIII). Moreover, above conditions (V) and (XIII) are particularly effective in eliminating coma which is liable to take place in an intermediate zone in the picture field at a short focal length.

Thus a very efficient zoom lens for the range from wide angle to telephoto uses thereof can be obtained by shifting the first group of negative lenses ($L_1$) as a unit and the second group of convex lenses ($L_2$) as another unit in the direction of the arrows shown in FIG. 2 under the above-mentioned relative conditions.

A practical example of this invention is shown as follows:

In this example, $r_1, r_2 \ldots r_{19}$ are curvature radii of the respective lenses, $d_1, d_2 \ldots d_{18}$ are thicknesses at the center of the respective lenses and air spaces, $n_1, n_2 \ldots n_{12}$ are indices of refraction for the $d$-line of the respective glass materials, and $v_1, v_2 \ldots v_{12}$ are Abbe numbers of the respective glass materials.

Example:

$f = 100$ to $193 \qquad r_1 + 1322.732$

| | | | | |
|---|---|---|---|---|
| $L_1$ $f_1 = -238.62$ | $r_2 = -607.735$ | $d_1 = 22.65$ | $n_1 = 1.74057$ | $v_1 = 27.7$ |
| | $r_3 = +278.149$ | $d_2 = 7.73$ | $n_2 = 1.49892$ | $v_2 = 65.7$ |
| | $r_4 = +1,735.635$ | $d_3 = 14.09$ | | |
| | $r_5 = +278.149$ | $d_4 = 6.91$ | $n_3 = 1.69139$ | $v_3 = 54.6$ |
| | | $d_5 = 12.43$ | | |
| | $r_6 = +1,043.039$ | $d_6 = 6.91$ | $n_4 = 1.69139$ | $v_4 = 54.6$ |
| | $r_7 = +367.003$ | $d_7 = 193.37$ to $27.62$ | | |
| $L_2$ $f_2 = 144.16$ | $r_8 = +225.746$ | $d_8 = 9.39$ | $n_5 = 1.63900$ | $v_5 = 55.7$ |
| | $r_9 = +564.365$ | $d_9 = 0.28$ | | |
| | $r_{10} = +116.022$ | $d_{10} = 16.85$ | $n_6 = 1.63900$ | $v_6 = 55.7$ |
| | $r_{11} = +706.768$ | $d_{11} = 0.83$ | | |
| | $r_{12} = +63.028$ | $d_{12} = 18.78$ | $n_7 = 1.67045$ | $v_7 = 47.0$ |
| | $r_{13} = +176.796$ | $d_{13} = 11.33$ | $n_8 = 1.46398$ | $v_8 = 65.4$ |
| | $r_{14} = -418.729$ | $d_{14} = 3.04$ | $n_9 = 1.68927$ | $v_9 = 33.1$ |
| | $r_{15} = +40.718$ | $d_{15} = 26.24$ | | |
| | $r_{16} = -649.171$ | $d_{16} = 5.52$ | $n_{10} = 1.56091$ | $v_{10} = 45.3$ |
| | $r_{17} = +101.478$ | $d_{17} = 37.57$ | $n_{11} = 1.66067$ | $v_{11} = 57.4$ |
| | $r_{18} = -55.249$ | $d_{18} = 7.46$ | $n_{12} = 1.53959$ | $v_{12} = 59.7$ |
| | $r_{19} = -125.630$ | | | |

By the above described invention a zoom lens for use in still cameras covering the range from wide angle to telephoto which has hitherto been considered as impossible, is produced, eliminating thereby the inconvenience of equipping the camera with several interchangeable lenses.

Moreover, by making the second group of positive lenses ($L_2$) play two roles concurrently, as both a magnifying lens and a relay lens in the simplest way, the zoom lens of this invention is the smallest, lightest and most compact of zoom lenses of this kind. Also, by shifting the second group of positive lenses ($L_2$) with a diaphragm D in them, its function as a relay lens is fully utilized and the whole optical performance of the zoom lens is most improved.

Furthermore, as it is of a so-called retrofocus type which has a concave lens before the relay lens, the backfocus becomes so large that it can easily be attached to a single lens reflex camera.

Even though the primary object of this zoom lens has been for use in still cameras, it can also be used for television and motion picture purposes.

What I claim is:

1. A zoom lens consisting of a first group of negative lenses having a focal length of $f_1$ and a second group of positive lenses having a focal length of $f_2$ satisfying the relations $$f = \frac{f_1 f_2}{f_1 + f_2 - a}$$

$$l_2 = \frac{f_1 f_2 - f_2 a}{f_1 + f_2 - a}$$

$$l_1 = \frac{f_1 f_2 + f_1 a - a^2}{f_1 + f_2 - a}$$

where $f$ denotes the compound focal length, $l_1$ the distance from the fixed focal plane to the principal plane of the first lens group, $l_2$ the distance from the fixed focal plane to the principal plane of the second lens group, and $a$ the distance between said principal planes, the lens groups being movable axially relative to each other, the first group of lenses comprising a cemented lens consisting of a positive lens and a negative lens joined together and at least one negative lens, the second group of lenses comprising at least one single positive lens, a first cemented lens of meniscus shape consisting of three lenses joined together with the positive side of the first cemented meniscus shaped lens facing the object, and a second cemented lens consisting of a negative lens, a positive lens and a meniscus lens joined together in that order with the positive side of the second cemented lens facing the image, the individual lenses satisfying the following conditions:

$$r_3 \leq \tfrac{1}{2} |r_1|$$

$$0.3 f_2 \leq r_{12} \leq 0.5 f_2$$

$$0.8 f_2 \leq r_{13} \leq 1.4 f_2$$

$$0.2 f_2 \leq r_{15} \leq 0.3 f_2$$

$$0.5 f_2 \leq r_{17} \leq 0.8 f_2$$

$$0.2 f_2 \leq -r_{18} \leq 0.4 f_2$$

$$1.65 \leq n_7 \leq 1.74$$

$$1.43 \leq n_8 \leq 1.56$$

$$1.66 \leq n_9 \leq 1.77$$

$$1.50 \leq n_{10} \leq 1.58$$

$$1.64 \leq n_{11} \leq 1.73$$

$$1.51 \leq n_{12} \leq 1.64$$

$$0.1 f \leq d_{15} \leq 0.3 f$$

where $r_1$ is the radius of curvature of the free surface of the positive lens of the cemented lens of the first lens group, $r_3$ that of the free surface of the negative lens of the cemented lens of the first lens group, $r_{12}$ that of the free surface of the meniscus lens of the first cemented lens of the second lens group, $r_{13}$ that of the cemented surface of the meniscus lens of the first cemented lens of the second lens group, $r_{15}$ that of the free surface of the negative lens of the first cemented lens of the second lens group, $r_{17}$ that of the cemented surface of the negative lens of the second cemented lens of the second lens group, $r_{18}$ that of the cemented surface of the positive lens of the second cemented lens of the second lens group, $n_7$ is the Abbe number of the glass of the meniscus lens of the first cemented lens of the second lens group, $n_8$ that of the positive lens of the first cemented lens of the second lens group, $n_9$ that of the negative lens of the first cemented lens of the second lens group, $n_{10}$ that of the negative lens of the second cemented lens of the second lens group, $n_{11}$ that of the positive lens of the second cemented lens of the second lens group, $n_{12}$ that of the meniscus lens of the second cemented lens of the second lens group, and $d_{15}$ is the distance along the optical axis of the air space between the first and second cemented lenses of the second lens group.

2. The zoom lens according to claim 1 in which the first group of lenses has two negative lenses, the second group of lenses has two single positive lenses and an iris diaphragm between the first and second cemented lenses thereof, $f$ has a minimum value of 100 and a maximum value of 193, $f_1$ equals $-238.62$, $f_2$ equals 144.16, and the other numerical data is as follows:

| Lens Group | Radius of Curvature | Lens Thickness and Air Space | Index of Refraction | Abbe Number |
|---|---|---|---|---|
| $L_1$ | $r_1 = +1,322.732$ | $d_1 = 22.65$ | $n_1 = 1.74057$ | $v_1 = 27.7$ |
| | $r_2 = -607.735$ | $d_2 = 7.73$ | $n_2 = 1.49892$ | $v_2 = 65.7$ |
| | $r_3 = +278.149$ | $d_3 = 14.09$ | | |
| | $r_4 = +1,735.635$ | $d_4 = 6.01$ | $n_3 = 1.69139$ | $v_3 = 54.6$ |
| | $r_5 = +278.149$ | $d_5 = 12.43$ | | |
| | $r_6 = +1,043.039$ | $d_6 = 6.91$ | $n_4 = 1.69139$ | $v_4 = 54.6$ |
| | $r_7 = +367.003$ | $d_7 = 193.37$ to $27.62$ | | |

| Lens Group | Radius of Curvature | Lens Thickness and Air Space | Index of Refraction | Abbe Number |
|---|---|---|---|---|
| $L_2$ | $r_8 = +225.746$ | $d_8 = 9.39$ | $n_5 = 1.63900$ | $v_5 = 55.7$ |
| | $r_9 = +564.365$ | $d_9 = 0.28$ | | |
| | $r_{10} = +116.022$ | $d_{10} = 16.85$ | $n_6 = 1.63900$ | $v_6 = 55.7$ |
| | $r_{11} = +706.768$ | $d_{11} = 0.83$ | | |
| | $r_{12} = +63.028$ | $d_{12} = 18.78$ | $n_7 = 1.67045$ | $v_7 = 47.0$ |
| | $r_{13} = +176.796$ | $d_{13} = 11.33$ | $n_8 = 1.46398$ | $v_8 = 65.4$ |
| | $r_{14} = -418.729$ | $d_{14} = 3.04$ | $n_9 = 1.68927$ | $v_9 = 31.1$ |
| | $r_{15} = +40.718$ | $d_{15} = 26.24$ | | |
| | $r_{16} = -649.171$ | $d_{16} = 5.52$ | $n_{10} = 1.56091$ | $v_{10} = 45.3$ |
| | $r_{17} = +101.478$ | $d_{17} = 37.57$ | $n_{11} = 1.66067$ | $v_{11} = 57.4$ |
| | $r_{18} = -55.249$ | $d_{18} = 7.46$ | $n_{12} = 1.53959$ | $v_{12} = 59.7$ |
| | $r_{19} = -125.630$ | | | | where $r_{\text{subscripts}}$ denote the radii of curvature of the respective surfaces, $n_{\text{subscripts}}$ the refractive indices measured at the $d$-line of the spectrum of the glasses of the respective elements, $v_{\text{subscripts}}$ the Abbe numbers of the respective elements, and $d_{\text{subscripts}}$ the axial distances between successive surfaces of the elements, each from the front to the rear of the zoom lens system in order.

References Cited in the file of this patent

UNITED STATES PATENTS 3,064,533    Hudson _____ Nov. 20, 1962

FOREIGN PATENTS 1,259,007    France _____ Mar. 13, 1961